(12) United States Patent
Jones et al.

(10) Patent No.: US 6,214,228 B1
(45) Date of Patent: Apr. 10, 2001

(54) LIQUID EFFLUENT TREATMENT PLANT AND PROCESS

(75) Inventors: Richard Bernard Jones, Darlington; Andrew James Watson, North Alleton, both of (GB)

(73) Assignee: Kvaerner Technology & Research Limited, London (GB)

( * ) Notice: Subject to any disclaimer, the term of this patent is extended or adjusted under 35 U.S.C. 154(b) by 0 days.

(21) Appl. No.: 09/254,854

(22) PCT Filed: Sep. 5, 1997

(86) PCT No.: PCT/GB97/02392

§ 371 Date: Mar. 11, 1999

§ 102(e) Date: Mar. 11, 1999

(87) PCT Pub. No.: WO98/11028

PCT Pub. Date: Mar. 19, 1998

(30) Foreign Application Priority Data

Sep. 13, 1996 (GB) ................................... 9619197

(51) Int. Cl.⁷ ................................. C02F 3/30; C02F 3/02
(52) U.S. Cl. ........................... 210/603; 210/605; 210/621
(58) Field of Search .................................. 210/605, 623, 210/603, 621

(56) References Cited

U.S. PATENT DOCUMENTS

| | | | |
|---|---|---|---|
| Re. 32,429 | * 6/1987 | Spector . | |
| 3,953,327 | 4/1976 | Parker | 210/7 |
| 4,425,231 | * 1/1984 | Fujimoto et al. | 210/605 |
| 4,552,663 | 11/1985 | Spector et al. | 210/605 |
| 5,192,442 | * 3/1993 | Piccirillo et al. | 210/605 |
| 5,518,618 | * 5/1996 | Mulder et al. | 210/605 |
| 5,531,896 | 7/1996 | Tambo et al. | 210/605 |
| 5,910,245 | * 6/1999 | Bernhardt et al. | 210/605 |

FOREIGN PATENT DOCUMENTS

| | | | |
|---|---|---|---|
| 0 739 860 A1 | 10/1996 | (EP) | C02F/3/30 |
| 1473665 | 11/1973 | (GB) | C02C/1/02 |
| 58-128195 | 7/1983 | (JP) | C02F/3/30 |
| 7-60284 | 3/1995 | (JP) | C02F/3/30 |

OTHER PUBLICATIONS

International Search Report of PCT/GB97/02392, 4 pages, Jan. 21, 1998.
Patent Abstracts of Japan, Publication No. 58128195, Publication Date: Jul. 30, 1983, Application Date: Jan. 25, 1982, Application No. 57010769, Applicant: Kubota Ltd., Inventor: Sato Hachiro, Title: Septic Tank of Hardly Disposable Sewage of Night Soil.
Patent Abstracts of Japan, Publication No. 07060284, Publication Date: Mar. 7, 1995, Application Date: Aug. 30, 1993, Application No. 05235956, Applicant: Mitsubishi Kakoki Kaisha Ltd., Inventor: Nakahata Shigeo, Title: Nitrification and Denitrification Treatment Devise.

* cited by examiner

*Primary Examiner*—Chester T. Barry
(74) *Attorney, Agent, or Firm*—Senniger, Powers, Leavitt & Roedel (57) ABSTRACT

The invention relates to an effluent treatment plant and to a method for treating effluent. The plant comprises a pair of elongate vessels (5, 12), one vessel (12) being for aerobic and the other (5) being for anoxic metabolisation of effluent by microorganismas, each vessel having a downcomer zone (4, 11) and a riser zone (7, 14). The first riser zone (7) of the vessel (5) for anoxic metabolisation communicates with the downcomer zone (11) of the vessel (12) for aerobic metabolisation.

18 Claims, 3 Drawing Sheets

LIQUID EFFLUENT TREATMENT PLANT AND PROCESS

The present invention relates to a liquid effluent treatment plant and to a process for treating a liquid effluent such as waste water.

U.S. Pat. No. 4,552,663 describes a process for the removal of ammoniacal nitrogen in the BOD sorption zone of a waste water treatment plant. The BOD sorption zone A, which may be provided with a blanket of nitrogen, comprises a tank partitioned to provide two or more liquid treating sections in order to approximate plug flow of the liquid through the BOD sorption zone A. Liquid from zone A is discharged into the BOD oxidation zone B and is aerated therein. Aeration in each liquid treating section of zone B is proposed using spargers for the purpose. From zone B the liquid passes to a sedimentation tank from which settled sludge is recycled to BOD sorption zone A.

In U.S. Pat. No. 3,953,327 it is proposed to treat sewage by anoxic denitrification while supplying methanol as food for bacteria, followed by stabilisation by aeration and sedimentation. Resulting sludge is recycled to the denitrification step and separated, relatively clear effluent is removed from the process.

A conventional Deep Shaft waste water treatment plant is described in GB-A-1473665. Such a plant includes a basin, a riser and a downcomer whose upper ends communicate with each other and with the basin and whose lower ends communicate with each other, as well as circulating means for circulating an effluent, such as sewage, around the system and means for supplying an oxygen-containing gas to the effluent in the downcomer. The downcomer is of a length such that the oxygen transfer rate into the effluent is at least 0.1 kg $O_2$/hr/m$^3$. At start up, air is injected into the riser causing its upper section to act as an air-lift pump.

When the effluent is circulating at a suitable velocity, e.g. at least 1 meter/sec in the downcomer, the proportion of air which is supplied to the downcomer is increased. Eventually circulation can, if desired, be maintained by supplying air only to the downcomer. The point of injection of air into the downcomer and into the riser is preferably at a position between 0.1 and 0.4 times their total length below the level of the effluent (e.g. sewage) in the basin. Thus when the system extends from 150 to 250 meters below the level of effluent (e.g. sewage) in the basin, gas is injected 15 to 100 meters below this level. It is further preferred that air injection takes place at a position more than 30 meters below the level of sewage or other effluent in the basin.

A further description of such a plant can be found in an article by B. Jones in Waste Management & the Environment, Vol 5(3), June 1995, pages 44 and 45.

The practical depth of the shaft in commercial plants, of which there are now more than 70 operating throughout the world, is from 50 to 150 meters. If air is injected into the downcomer 35 meters down a 100 meter shaft, then the path length for the air supplied to the downcomer is 165 meters, giving a contact time of around 3 minutes, compared with about 15 seconds in a conventional diffused air process. Most bubbles dissolve before reaching the bottom of the shaft. Because of the greater solubility of oxygen at the bottom of the shaft, due to the increased hydrostatic pressure, there is a large driving force for oxygen transfer. This has been shown to result in oxygen transfer figures of 3 kg $O_2$/m$^3$/hr compared to 0.05 to 0.2 kg $O_2$/m$^3$/hr for more conventional processes. This characteristic allows the Deep Shaft process to treat strong wastes at an increased loading rate, expressed as the food/microorganism (f/m) ratio. Absorption efficiency of oxygen can reach 80% in a Deep Shaft compared with 15% in a diffused air process. These factors, plus the high turbulence of the liquid in the shaft, are the main cause of the high power efficiencies observed in the shaft (3 to 4 kg $O_2$/kWhr compared to 1 kg $O_2$/kWhr in a conventional process). Another advantage of the Deep Shaft process is that the high velocities (1 to 2 m/sec) ensure that solids do not settle out in the shaft, making primary settlement unnecessary.

Further details of the Deep Shaft process can be found in an article by D. A. Hines et al. in I. Chem. E. Symposium Series No. 41 at pages D1 to D10.

Bacteria in the liquid effluent circulating in the plant metabolise organic and certain inorganic molecules present in the effluent. Many types of effluent may be treated in this way. For example, domestic sewage, food waste, waste paper and industrial effluent from the textiles industry, the plastics industry and the steel industry are all treated currently by commercial plants of this type.

In operation, a conventional Deep Shaft plant is initially seeded with a load of slurry from a sewage plant. Once circulation of the effluent is initiated, the enhanced aeration of the system provides suitable conditions for the aerobic bacteria to thrive.

In the downcomer the bubbles of air entering the system tend to rise against the flow of the liquid effluent. However, once the liquid circulation rate reaches a value greater than the upward velocity of an air bubble, air bubbles entering the downcomer are drawn downwards by the moving effluent until, eventually, the air stream to the riser can be cut off, with air then being supplied to the system only in the downcomer. Because of the voidage in the effluent in the riser the specific gravity of the mixture of air and effluent in the riser can be as much as 0.20 g/cm$^3$ less than that of the unaerated liquid effluent at the top of the downcomer. Hence the circulation of effluent through the plant is assisted by the hydraulic pressure differential above the air supply point in the downcomer, due to the significant difference in specific gravity between the air bubble-containing aerated effluent in the riser and the non-aerated effluent at the top of the downcomer.

A conventional plant of this type is adequate for removal of molecules susceptible to metabolisation by aerobic bacteria. However, there are limitations on the effectiveness of such a plant in liquid effluent and waste water treatment. In particular, aerobic bacteria are not capable of digesting nitrates which may be produced in large quantities inside the shaft as a product of the metabolisation by the aerobic bacteria of ammonia. Ammonium ions are very common in many types of effluent, including domestic waste and sewage. Ammonia is also malodorous at high concentrations and toxic to aquatic organisms even in low concentrations; accordingly it is required to be removed from effluents by legislation in many countries. In addition it has a high biological oxygen demand (BOD). Although nitrates do not present the same problems as ammonia, their removal from waste water is highly desirable and is legislated for in some countries. Nitrates are natural fertilisers and their release into the environment, particularly in still waters, such as lakes and reservoirs, facilitates algal growth. Excessive nitrate release into environmental waters can give rise to a phenomenon known as eutrophication in which an aquatic environment becomes subject to excessive plant and algal growth and is eventually starved of important nutrients such as phosphorus because of intense algal bloom. Starvation and death of the algae population then follows and the decay of their cell material by aerobic metabolism depletes the water of oxygen, so that fish and other oxygen-dependent organisms are destroyed.

To combat the problem of nitrates in effluent which, when treated, is to be released into the environment, anoxic bacteria are conventionally used to reduce nitrates to nitrogen gas. These anoxic bacteria are provided in an anoxic tank upstream of the Deep Shaft. A minor stream of effluent from the Deep Shaft is generally recycled to the tank. However, such a system suffers from a number of disadvantages. In particular, the residence time of the recycled effluent in the anoxic tank is long enough for any aerobic bacterial activity in the recycle stream to be inhibited. Furthermore, it is very difficult to prevent fumes of noxious chemicals such as fatty acids escaping from the tank. Such escapes often give rise to the characteristically unpleasant odour in the environs of a liquid effluent treatment plant such as a waste water treatment plant.

In Patent Abstracts of Japan, Vol. 095, No. 006 (1995) and JP-A-07060284 there is disclosed a nitrification and denitrification treatment device with a denitrification tank having a closed structure and a deep nitrification tank connected in series with a nitrification liquid-circulating flow path for circulating the nitrification liquid of the nitrification tank to the denitrification tank. The denitrification tank is filled with microorganism-immobilizing gel including denitrification bacteria and is provided with a circulation means by means of which gas for agitating and fluidizing the microorganism-immobilizing gel can be passed into the denitrification tank.

It is therefore an object of the present invention to provide an effluent treatment plant which addresses the aforementioned problems and in which the disadvantages of the prior art are substantially alleviated or obviated. It is a further object of the invention to provide an effective and environmentally acceptable method of effluent treatment.

According to the present invention there is provided an effluent treatment plant comprising:

(a) a first elongate vessel for anoxic metabolisation of effluent contained within the vessel and passing therethrough under substantially plug flow conditions, the first elongate vessel having a substantially vertical first downcomer zone for transport of effluent under substantially plug flow conditions towards a bottom region of the first elongate vessel, and a substantially vertical first riser zone for transport of effluent under substantially plug flow conditions towards a top region of the first elongate vessel, a bottom region of the first downcomer zone communicating with a bottom region of the first riser zone;

(b) feed means for supplying to a top region of the first downcomer zone an effluent to be treated at a feed rate corresponding to a dwell time in the first elongate vessel of from about 90 seconds to about 5 minutes;

(c) first recovery means for recovery from the top of the first riser zone effluent that has passed through the first downcomer zone and then through the first riser zone;

(d) a second elongate vessel connected downstream from the first elongate vessel for aerobic metabolisation of effluent that has passed through the first elongate vessel and that is passing through the second elongate vessel under substantially plug flow conditions, the second elongate vessel having a substantially vertical second downcomer zone for transport of effluent under substantially plug flow conditions towards a bottom region of the second elongate vessel, and a substantially vertical second riser zone for transport of effluent under substantially plug flow conditions towards a top region of the second elongate vessel, a bottom region of the second downcomer zone communicating with a bottom region of the second riser zone;

(e) feed means for feeding effluent from the first elongate vessel to a top region of the second downcomer zone;

(f) gas injection means for injecting an oxygen-containing gas into the second elongate vessel so as at least in part to facilitate and maintain circulation of effluent through the second elongate vessel;

(g) second recovery means for recovering effluent from the top region of the second riser zone; and (h) means for recycling at least a part of the effluent that has passed through the second elongate vessel to a top region of the first downcomer zone.

In such a plant effluent flows down through the first downcomer zone, up through the first riser zone, down through the second downcomer zone, and up through the second riser zone and substantially anoxic conditions for bacteria in the effluent are maintained throughout at least a majority of the dwell period of effluent in the first elongate vessel while substantially aerobic conditions are maintained for bacteria in the effluent throughout at least a majority of the dwell period of effluent in the second elongate vessel. Moreover the overall flow through the plant is under substantially plug flow conditions with recycle.

The feed means for supplying to a top region of the first downcomer zone an effluent to be treated may comprise a header tank communicating with the first downcomer zone.

Preferably the top region of the second downcomer zone has an enclosed connection to the top region of the first riser zone for passage of effluent from the first riser zone into the second downcomer zone. This has the benefit that noxious-smelling fumes cannot escape from the plant in this region.

The plant may further comprise gas venting means for venting nitrogen-containing gases generated in the first elongate vessel.

In one arrangement the feed means to the first downcomer zone comprises a first header tank, the first recovery means comprises a second header tank communicating with the top of the first riser zone, and the arrangement is such that the effluent surface level in the first header tank is higher than that in the second header tank whereby effluent can be caused to flow through the first elongate vessel by siphonic action.

In an alternative arrangement the feed means to the first downcomer zone comprises a first header tank, the first elongate vessel further comprises inert gas injection means for injecting inert gas into the first riser zone to facilitate and maintain movement of effluent through the first elongate vessel by a gas-lift pump action and a degassing zone for degassing of effluent emerging from the top of the first riser zone, and the degassing zone communicates with the first header tank to permit recycle of effluent from the degassing zone to the first downcomer zone. In such a plant the first elongate vessel may further comprise gas recovery means for recovering gas from the degassing zone for recycle to the inert gas injection means.

In one preferred embodiment of the invention, at least one of the first and second elongate vessels comprises a pair of lined shafts, each for example from about 2 to about 10 meters in diameter, preferably from about 2 to about 8 meters in diameter, sunk in the ground adjacent to one another to an appropriate depth, for example from about 30 meters to about 150 meters, with a lined tunnel joining the bottom ends thus forming a generally U-shaped vessel, the one shaft providing a downcomer zone and the other providing a riser zone. The areas of cross section of each downcomer and its associated riser zone may be equal to each other or different so that the downward velocity of the effluent in the downcomer zone may be higher than the upward velocity of the mixture of gas and effluent in the corresponding riser zone. For example, the cross sectional areas can be chosen so that the downward velocity of the effluent in a downcomer zone, e.g the second downcomer zone, can be from about 1.2 to about 2.0 meters/sec, whereas the upward velocity in the corresponding riser zone can be lower, though is preferably at least about 0.5 meters/sec, for example from about 1.2 to about 2.0 meters/sec.

Although it will usually be most practical to sink circular shafts, any other cross section of shaft may be used, for example square or rectangular. Such shafts are conveniently lined with concrete or other suitable lining material. An impervious layer, for example a layer of polyolefin sheet, such as polyethylene or polypropylene sheet, can be incorporated in the lining of the shaft in order to minimise the risk of leakage of effluent from the shaft.

Alternatively, at least one of the first and second elongate vessels may comprise an elongate lined shaft having a partition between the downcomer zone and the riser zone along a major portion of the length of the shaft with the bottom of the partition forming an underflow weir. In yet another embodiment there is provided a single elongate lined shaft having a cruciform partition dividing the interior of the shaft into four respective substantially vertical channels which may be of substantially equal area of cross section to one another or have different areas of cross section. These substantially vertical channels form respectively the first downcomer zone, the first riser zone, the second downcomer zone, and the second riser zone, with one part of the cruciform partition providing an underflow weir between the first downcomer zone and the first riser zone and another part of the cruciform partition forming an overflow weir between the first riser zone and the second downcomer zone; this overflow weir can be fully enclosed with a vent gas line for venting gas produced by anoxic bacterial action. Alternatively, the first and second vessels may be defined by three concentric endless partitions located in a single shaft which thus divide the shaft into four substantially vertical concentric channels; in this case the first downcomer zone can be the central channel within the innermost partition which forms an underflow weir at its lower end, the next outward channel between the innermost partition and the next outward partition forming the first riser zone while that next outward partition forms an overflow weir to the third channel which in turn acts as the second downcomer zone and is separated from the outermost channel by the third partition which acts as an underflow weir, the outermost channel forming the second riser zone. The overflow weir between the first riser zone and the second downcomer zone can be enclosed with a vent gas line for venting gas produced by anoxic bacterial action. In another possible arrangement of such a shaft with three concentric partitions the outermost channel forms the first downcomer zone, the next inner channel the first riser zone, the next inward channel the second downcomer zone, and the innermost channel the second riser zone.

In difficult terrain for sinking shafts part or all of the plant can be built above ground level.

The plant of the invention includes gas injection means for injecting an oxygen-containing gas into the second elongate vessel so as at least in part to facilitate circulation of effluent through the second elongate vessel such that effluent flows down through the second downcomer zone, and up through the second riser zone and, if desired, to assist in maintaining such circulation through the second elongate vessel. Such gas injection means preferably includes means for injecting oxygen-containing gas into the second downcomer zone; it may further include means for injecting oxygen-containing gas into the second riser zone principally in order to initiate circulation of effluent through the plant by an air-lift pump principle. The point of injection of oxygen-containing gas into the second downcomer zone and into the second riser zone is in each case preferably at a position between 0.1 and 0.4 times its respective total depth. Thus when the zones extend to a depth of from 150 to 250 meters below the surface of the terrain, oxygen-containing gas is injected 15 to 100 meters below this level. It is further preferred that air injection takes place at a position more than 30 meters down the second downcomer zone and the second riser zone respectively. Conveniently the points of injection into the second downcomer and second riser respectively are at depths which are at essentially the same hydrostatic pressure when effluent is circulating. In this way a common oxygen-containing gas supply conduit can be used to supply both gas injection means.

A suitable gas injection means comprises at least one flat-shaped tube having a plurality of lateral holes through which gas may be drawn laterally into the circulating effluent. The holes are preferably such as to produce bubbles in the effluent of initial diameter within the range of from about 2 mm to about 8 mm.

Typical oxygen-containing gases include air, oxygen-enriched air and pure oxygen. The use of air is preferred, principally on the grounds of cost.

Instead of using an air-lift pump method of initiating and maintaining circulation of effluent there can alternatively be used a propeller or propellers, an axial flow pump or pumps, or an axial flow turbine or turbines. However, provision of means for injection of air into the second riser is usually preferred for maintaining circulation of effluent in the plant of the invention.

Movement of effluent through the second elongate vessel can be initiated by initially injecting oxygen-containing gas, e.g. air, into the second riser zone only. The supply of gas to the second riser zone causes movement of effluent by an air-lift pump effect because of the density difference between the mixed gas/effluent combination in the upper part of the second riser zone and the effluent in the second downcomer zone at start up of the plant. This density difference can be as high as 0.2 $g/cm^3$. Once effluent is moving at a sufficiently high rate air can then be injected also into the second downcomer zone. Eventually, when the effluent velocity in the second elongate vessel reaches about 1.0 meters/second, the supply of oxygen-containing gas to the second riser can be cut off, if desired, so that circulation is maintained solely by the supply of oxygen-containing gas to the second downcomer zone.

The plant of the invention can be constructed so that effluent passes through the first elongate vessel on a "once through" basis and then passes, also on a "once through" basis through the second elongate vessel. In such a plant, which is for convenience hereafter termed a "double once through" plant, there is no recycle of effluent around either the first elongate vessel or around the second elongate vessel. Instead effluent recovered from the second riser zone of the second elongate vessel can be recycled to the first downcomer zone of the first elongate vessel.

In another form of plant according to the invention effluent is arranged to pass through the first elongate vessel on a "once through" basis and then to pass through the second elongate vessel which is arranged on a recirculating basis with effluent recovered from the second riser zone being recirculated to the top of the second downcomer zone. Such a plant can be termed, for convenience, a "once through anoxic/recirculating aerobic" plant.

In yet another form of plant according to the invention, effluent is arranged to be recycled around the first elongate vessel a plurality of times before passing on to the second elongate vessel around which the effluent is also recycled a plurality of times. Such a plant can be termed, for convenience a "double recirculating" plant.

At start up, the plant is filled with sewage or other effluent and a charge of sludge (e.g. a truck load of sewage sludge) from an existing treatment plant is then dumped into the effluent in one or both of the first and second elongate vessels of the plant in order to "seed" the effluent with aerobic and anoxic bacteria. Initially the effluent is circulated in a closed loop through the plant or in separate loops through the first and second elongate vessels respectively. When the circulating effluent contains adequate populations of aerobic and anoxic bacteria, incoming effluent can be fed to the first elongate vessel of the plant while a corresponding volume of treated effluent can be withdrawn from the second elongate vessel.

The supply of oxygen containing gas to the second vessel serves to maintain the second vessel under conditions effective for aerobic metabolisation of the effluent, at least for a majority of the dwell period of effluent in the second elongate vessel. That is to say, aerobic bacteria thrive and multiply in the second vessel. The first vessel, on the other hand, is not aerated. Thus substantially anoxic conditions for bacteria in the effluent are maintained throughout at least a majority of the dwell period of effluent in the first elongate vessel. The first elongate vessel is thereby maintained under conditions effective for anoxic metabolisation of the effluent and the anoxic bacteria thrive and multiply in this vessel. On the other hand growth of aerobic bacteria is substantially halted in the first elongate vessel. However, since the dwell in the first elongate vessel is relatively short, i.e. from about 90 seconds to about 5 minutes, the aerobic bacteria remain viable but dormant so that upon entry to the second elongate vessel they can commence to grow and multiply under the aerobic metabolisation conditions in the second elongate vessel.

In a "double once through" plant according to the invention, the circulation rate through the first and second vessels can be high, so that the dwell time in each vessel is only a matter of a few minutes, for example about 90 seconds to about 5 minutes, and there is insufficient time for the population of aerobic bacteria to dwindle under the anoxic conditions in the first elongate vessel and also insufficient time for the population of anoxic bacteria to dwindle under the aerobic conditions in the second elongate vessel. Hence vigorous populations of both types of bacteria can survive in the circulating effluent in a "double once through" plant.

The plant of the invention provides several significant advantages over conventional plants known in the art. Effluent circulating in the plant is highly aerated in the second elongate vessel and can therefore handle a high concentration of biomass. Typically, a plant according to the invention can handle from about 6000 mg to about 20000 mg of biomass per liter of liquid in the plant. This enables the plant to cope efficiently with a high concentration of incoming effluent. The enhanced aeration of the effluent in the plant, caused by the constant recycling of the effluent through regions of aeration, enables the plant to run at a high f/m ratio (food/microorganism ratio) in comparison with conventional plants. Typically, a plant according to the invention can operate at an f/m ratio of 1.0 per day or higher. This improvement has consequent capital cost advantages since the use of a higher f/m ratio enables a smaller plant to cope with the same quantity of effluent as a larger plant operating at a lower f/m ratio.

A further advantage of the plant of the invention is that, due to the high liquid velocities in the downcomers and risers, there is a reduced risk of solid materials to settling out of the effluent and clogging the reactor.

The provision of the first elongate vessel operating under substantially anoxic conditions avoids the attendant disadvantages of prior art denitrification tanks, in which the residence time of the effluent is a number of hours. The residence time of the effluent in the anoxic region of the plant of the invention, i.e. the first elongate vessel, is an order of magnitude less than this, depending on the size of the plant and the recycling rate of the effluent. In a "double once through" plant the residence time in each of the first and second elongate vessels on each cycle of effluent through the plant is of the order of a few minutes only, for example from about 90 seconds to about 5 minutes. This means that the aerobic bacteria in the recycle stream are not destroyed but merely subdued, the bacteria once again thriving upon entering the aerated second vessel. Similarly, anoxic bacteria are merely subdued while passing through the aerated second vessel and recommence to thrive when recycled to the first vessel. However, the effluent is normally recycled many times through the first and second vessels so that the overall treatment time under anoxic and aerobic conditions respectively is measured in hours, for example from about 30 minutes up to about 5 hours.

The plant of the invention may further comprise a degassing tank for recovery of effluent from the riser zone of the second vessel and for allowing degassing of such effluent. In this case, the plant may be arranged such that the means for recycling at least a portion of effluent in the riser zone of the second vessel to the downcomer zone of the first vessel comprises means for recycling at least a portion of effluent recovered in the degassing tank to the first downcomer zone of the first elongate vessel. Since the air/effluent mixture has a lower density than that of the effluent alone, the degassing tank can be arranged so that the surface of the degassing effluent is at a height above the level of the surface of effluent in the header tank to the first downcomer zone; in this way the degassed effluent that is being recycled can flow under gravity back into that header tank. A treated effluent stream can be withdrawn from the degassing tank for further treatment, e.g. filtration and clarification.

The invention further provides a process for the treatment of effluent comprising:

(a) providing a first elongate vessel for anoxic metabolisation of effluent contained within the vessel, the first elongate vessel having a substantially vertical first downcomer zone for transport of effluent under substantially plug flow conditions towards a bottom region of the first elongate vessel, and a substantially vertical first riser zone for transport of effluent under substantially plug flow conditions towards a top region of the first elongate vessel, a bottom region of the first downcomer zone communicating with a bottom region of the first riser zone;

(b) supplying to a top region of the first downcomer zone an effluent to be treated at a feed rate corresponding to a dwell time in the first elongate vessel of from about 90 seconds to about 5 minutes;

(c) allowing the effluent to pass under substantially plug flow conditions through the first elongate vessel;

(d) recovering from the top of the first riser zone effluent that has passed through the first downcomer zone and the first riser zone;

(e) providing a second elongate vessel for aerobic metabolisation of effluent, the second elongate vessel having a substantially vertical second downcomer zone for transport of effluent under substantially plug flow conditions towards a bottom region of the second elongate vessel, and a substantially vertical second riser zone for transport of effluent under substantially plug flow conditions towards a top region of the second elongate vessel, a bottom region of the second downcomer zone communicating with a bottom region of the second riser zone;

(f) feeding effluent from the first elongate vessel to a top region of the second downcomer zone;

(g) injecting an oxygen-containing gas into the second elongate vessel so as at least in part to facilitate and maintain circulation of effluent through the second elongate vessel; and (h) recovering effluent from the top region of the second riser zone.

In order that the invention may be clearly understood and readily carried into effect, some preferred embodiments thereof and their use will now be described with reference to the accompanying drawings, in which.

Figure 1:
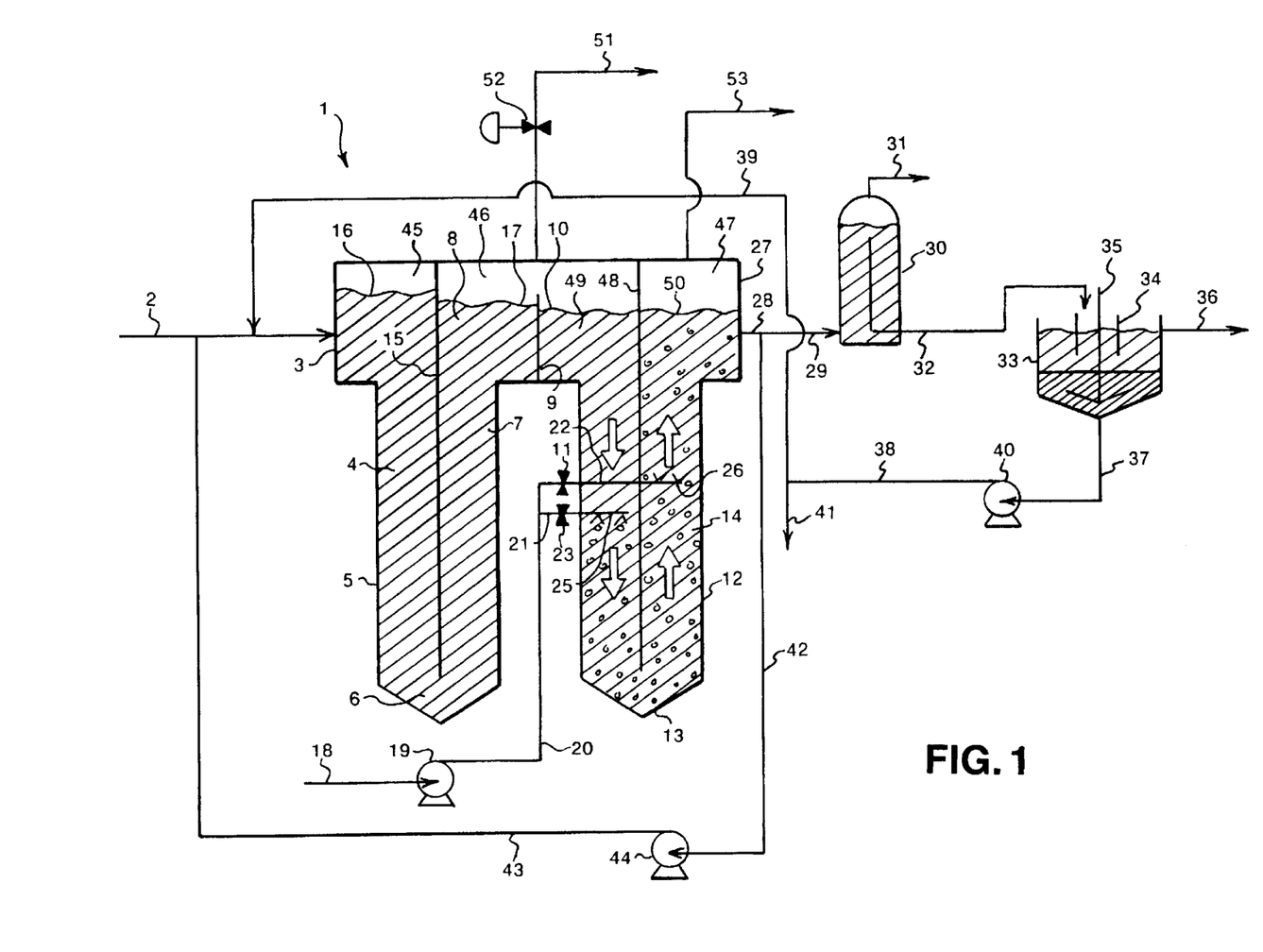
FIGS. 1 to 3 are each a flow diagram of a liquid effluent treatment plant constructed and arranged in accordance with the invention.

Referring to FIG. 1 of the drawings, there is shown a "double once through" liquid effluent treatment plant 1 for treatment of a liquid effluent, which is typically a domestic effluent or sewage and may contain suspended solids therein. However, it may alternatively be an industrial effluent or other kind of liquid effluent. The liquid effluent is supplied from an outside source (not shown), e.g. a sewer, via line 2 into the top of a first downcomer 4 which forms part of a generally U-shaped first elongate vessel 5. Conveniently downcomer 4 is formed by a lined shaft, typically from 3 to 8 meters in diameter, sunk in the ground to a depth of from about 40 to about 100 meters. This is linked at its bottom by a transverse tunnel (as indicated at 6) to an adjacent lined shaft 7 which forms a first riser and is also part of the first elongate vessel 5. The top of first riser 7 is provided with a header tank 8 which has a weir 9 over which the effluent, after passage through first elongate vessel 4, can flow to enter a header tank 10 at the top of a second downcomer 11 which is of a similar size to first downcomer 4 and forms part of a generally U-shaped second elongate vessel 12. The bottom of second downcomer 11 is connected by a transverse tunnel 13 to the bottom of second riser 14 which also forms part of second elongate vessel 12. The header tank 3 at the top of first downcomer 4 is separated from header tank 8 at the top of first riser 7 by a barrier 15. By allowing the surface 16 of the effluent in header tank 3 to build up when above the level of the top of weir 9, effluent will pass through the first elongate vessel 5 and over the top of weir 9 into the header tank 10 at the top of second downcomer 11.

Air or oxygen-enriched air is supplied to the plant from line 18 by means of pump 19 which feeds line 20. Line 20 has two branches 21 and 22 fitted with respective control valves 23 and 24. Branch 21 leads to a gas injection device 25 in second downcomer 11 and branch 22 leads to a corresponding gas injection device 26 in second riser 14. Injection devices 25 and 26 are typically at least 30 meters below ground level and can be positioned such that, when the plant is in full operation, the hydrostatic pressure at the two injection points are approximately equal. A mixture of effluent and air exits the top of second riser 14 into degassing tank 27. Degassed effluent is withdrawn from degassing tank 27 in line 28. Part is passed in line 29 to a vacuum degassing tank 30 which is connected by line 31 to a vacuum pump (not shown). A stream of degassed treated effluent passes from vacuum degassing tank 30 by way of line 32 to a central part of settling tank 33, which is provided with an annular baffle 34 and with a drive 35. Baffle 34 acts as an underflow weir. Clarified effluent is drawn off from a settling part of tank 33 exterior to annular baffle 34 in line 36. Settled solids can be recycled through lines 37, 38 and 39 to line 2 under the influence of pump 40 or discharged from the plant in line 41.

The remainder of the degassed effluent in line 28 can be recycled to line 2 in lines 42 and 43 under the influence of pump 44. This contains sufficient organic carbon (i.e. BOD) to satisfy conditions for denitrification in the first elongate vessel 9.

As can be seen from FIG. 1, the headspace 45 above the surface 16 of effluent in header tank 3 is separated by barrier 15 from the headspace 46 above weir 9 which is in turn separated from the headspace 47 in degassing tank 27 by barrier 48.

Reference numerals 49 and 50 indicate the surface levels of the effluent in header tank 10 and degassing tank 27 respectively.

Gas generated in first elongate vessel 5 can be vented via line 51 under the control of pressure relief valve 52. Similarly gas from headspace 47 of degassing tank 27 can be vented in line 53.

In some geographic regions, the geology may prevent the shafts extending below a certain depth. If a reactor of a certain size is required in such a situation then the desired size of the reactor may be achieved by corresponding increase in the bore of the shafts 4, 7, 11 and 14 which may be made larger to compensate for lack of depth. Alternatively a part of each of the elongate vessels 5 and 12 can be constructed above ground and the remainder sunk in the ground, or both elongate vessels 5 and 12 can be wholly constructed above ground.

At the start of operation of the plant 1, the first and second elongate vessels 5 and 12 are filled with effluent from line 2. A lorry load of sewage sludge from another sewage plant is tipped into the header tank 3 so as to ensure that the effluent circulating through the first and second elongate vessels 9 and 12 is seeded with suitable aerobic and anoxic bacteria for digestion of the biologically degradable matter in the effluent.

With valve 23 closed and valve 24 open, compressed air is then supplied by pump 19 by way of line 20 and branch 22 and injection device 26 to second riser 14 from lines 18. Valve 23 prevents simultaneous supply of compressed air to second downcomer 11. This causes effluent to flow up second riser 9 due to an air-lift pump effect and thus draws effluent down second downcomer 7. By supplying compressed air in second riser 14 a significant difference in density between the effluent in second downcomer 11 and that of the air-effluent mixture in riser 14 can be procured, possibly as much of a difference as 0.2 g/cm$^3$. When the effluent in shafts 4, 7, 11, 14 has begun to circulate, valve 23 can be opened somewhat to allow air to be injected into the downwardly flowing effluent in second downcomer 11. When the downward velocity of the effluent in second downcomer 11 exceeds a value equal to the upward velocity of a bubble in the effluent under static conditions, the bubbles of air supplied by way of injection device 25 to second downcomer 11 are dragged downwardly and into second riser 14 by the circulating effluent. When the downward effluent velocity in second downcomer 11 reaches a suitable operating value, typically at least about 1.0 meters/second, the supply of compressed air to second riser 14 via injection device 26 can, if desired, be shut off, its function to initiate circulation of the effluent having been achieved. Normally, however, it will be desirable to continue to supply air through both of the injection devices 25 and 26. Effluent circulates through shafts 4, 7, 11 and 14 respectively and the resulting air/effluent mixture passes into degassing tank 27 where it degasses and from where at least a portion thereof is recycled to line 2 by way of lines 42 and 43.

Once the effluent has been circulated through the first and second elongate vessels 5 and 12 for a sufficient period to allow growth of aerobic and anoxic bacteria throughout the circulating effluent, part of the degassed treated effluent is withdrawn in line 29. At the same time fresh effluent can be admitted via line 2 to header tank 3 at a corresponding rate. Treated effluent in line 29 is vacuum degassed in vacuum degassing tank 30 and passed through settling tank 33 before discharge in line 36 to a watercourse.

As the effluent passes through the aerated shafts 11 and 14 of the plant 1, aerobic bacteria metabolise organic compounds in the effluent and also convert ammonia to nitrates. When this nitrate-containing effluent is recycled through anoxic shafts 4 and 7, the anoxic bacteria metabolise nitrate to nitrogen, which is eventually released in the head space 46 and vented in line 51. Since the residence time of the effluent in the first elongate vessel 5 is only a matter of minutes, e.g. from about 90 seconds to about 5 minutes, for example about 3 minutes, the aerobic bacteria in the effluent are not deprived of oxygen for a period sufficient to allow the population thereof to diminish significantly. Similarly, because the residence time of the effluent in the second elongate vessel 12 is of a similar length to that for the first elongate vessel 5, the anoxic bacteria are not subjected to adverse conditions for a sufficient length of time for their numbers to decrease significantly in the effluent. By circulating the effluent a number of times through the plant, for example from about 15 times up to about 100 times or more, an adequate overall residence time for the effluent in the plant not only under anoxic conditions but also under aerobic conditions can be achieved. The resulting treated effluent in line 36 is, under suitable operating conditions, substantially nitrate-free and has a low residual BOD and COD level.

Since the second elongate vessel is deep, typically about 80 m deep, the hydraulic pressure in the transverse tunnel 6 is correspondingly high. This means that the gas pressure in any bubbles reaching this depth from gas distribution device 25 is equally high. As a result the solubility of $O_2$ in the effluent is greatly increased. Thus $O_2$ is more readily available to aerobic bacteria in the circulating effluent which results in a corresponding enhancement to the efficiency of the plant 1.

Since the anoxic zone formed by the first elongate vessel 5, the connection to the aerobic zone formed by the second elongate vessel 12, and the aerobic zone itself are all totally enclosed, any noxious fumes generated, particularly in the anoxic zone, are contained within the plant 1 and their discharge to the environment can be performed in a controlled manner or the vent gases in line 51 can be appropriately treated (e.g. by scrubbing with an alkali) prior to discharge to the environment.

Figure 2:
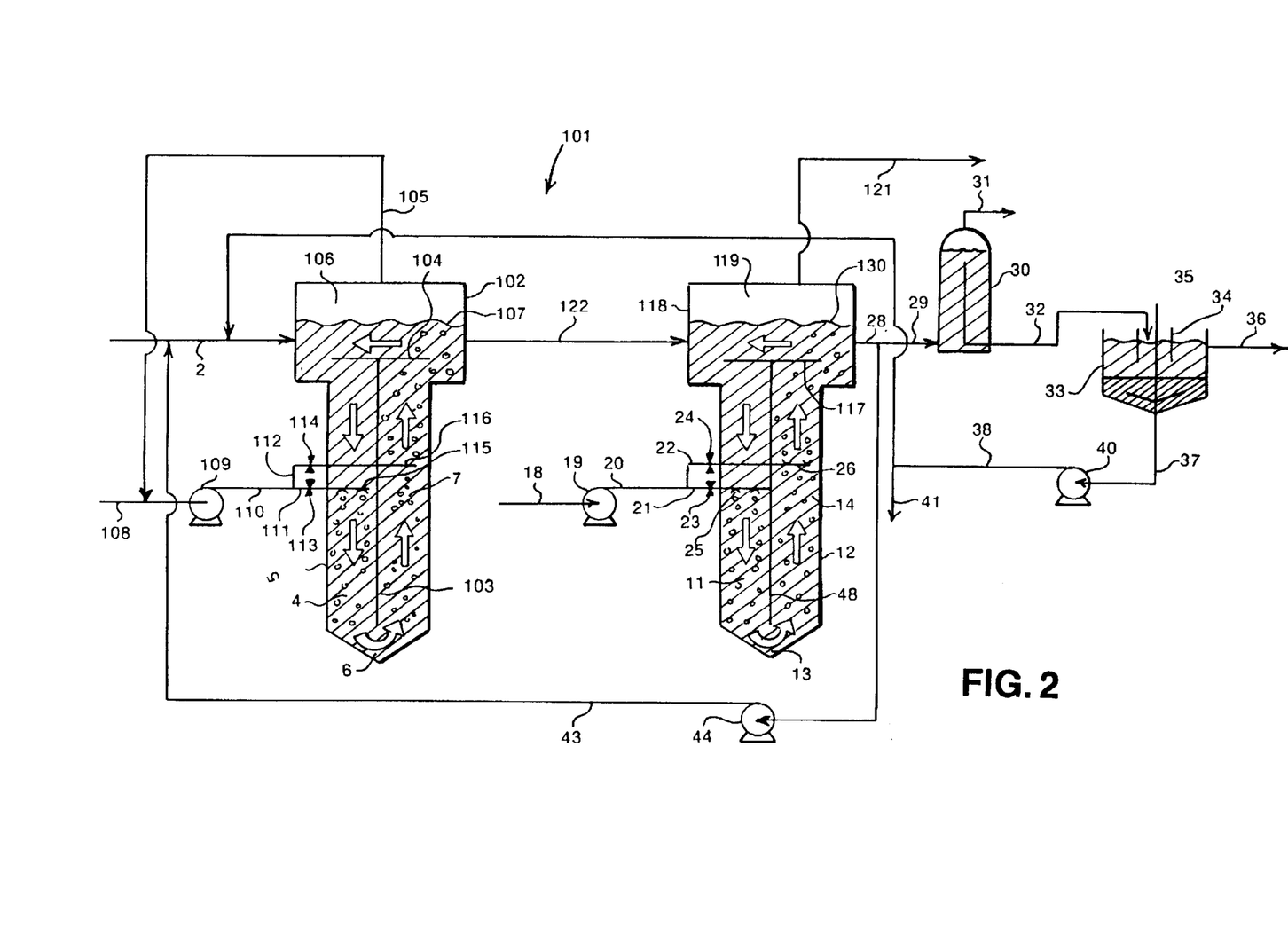

The plant of FIG. 2 is a plant of the "double recirculating" type and has many items in common with that of FIG. 1. Accordingly, for the sake of brevity, like items have been identified by like reference numerals in both FIGS. 1 and 2. However, whereas the plant 1 of FIG. 1 is operated so that the effluent passes in turn through the first and second elongate vessels 5 and 12, in the plant 101 of FIG. 2, effluent can be recycled through elongate vessel 5 a plurality of times, for example 15 to 100 times, before passing on to elongate vessel 12 through which it can then be recycled a plurality of times, for example 15 to 100 times.

Instead of having separate header tanks 3 and 8 for first downcomer 4 and first riser 7 respectively, in the plant 101 of FIG. 2 the first downcomer 4 and first riser 7 have a common header tank 102. At the top of vertical barrier 103 there is provided a horizontal baffle 104. Gas, mainly $N_2$, evolved in first elongate vessel 5 is extracted in line 105 from the headspace 106 above the surface 107 of the effluent in header tank 102. Additional $N_2$ can be introduced by way of line 108 into the gas in line 105 and the combined gas stream pumped by pump 109 through line 110 which divides into two branches 111 and 112 which are provided with respective valves 113 and 114. Branch 111 leads to gas injection device 115 in first downcomer 4 while branch 112 leads to a further gas distribution device 116 in first riser 7.

In the second elongate vessel 12 the barrier 48 is surmounted by a horizontal baffle 117 in a common header tank 118. Gas from the air/effluent mixture debauching from the second riser 14 is vented from the head space 119 above the surface 120 of effluent in header tank 118 by way of line 121.

Effluent from header tank 102 can be passed to header tank 118 in line 122.

At start-up of plant 101, the first elongate vessels 5 and 12 are filled with effluent and header tank 102 is charged with a tanker load of sewage sludge. Then $N_2$ is pumped from line 108 by pump 109 through line 110 and branch 112 (with valve 114 open) to gas injection device 116; during this time valve 113 is closed. Effluent then begins to circulate through first elongate vessel 5 due to the density difference between effluent in first downcomer 4 and the gas/effluent mixture in first riser 7. Gas emerging into the headspace 106 is recirculated via lines 105 and 110 under the influence of pump 109. Effluent emerging from the top of first riser 7 can overflow horizontal baffle 104 back into the top of first downcomer 4. When an adequate circulation of effluent has been established through the anoxic zone formed by first downcomer 4 and first riser 7, valve 113 can be opened and gas injected into the first downcomer 4; this is, however, not essential to operation of the plant 101 or even beneficial.

When the effluent has been circulated an adequate number of times through first elongate vessel 5 for anoxic bacteria to break down as much as possible of the nitrates in the effluent, some is drawn off from header tank 102 in line 122 while a corresponding quantity is introduced via line 2 into header tank 102.

Second elongate vessel 12 is operated in a similar manner to that used for plant 1 of FIG. 1. Gas from the air/effluent mixture from second riser 14 collects in headspace and is removed via line 121 while the effluent component can pass over horizontal baffle 117 back into the top of second downcomer 11. The effluent is circulated through the second downcomer 11 and second riser 14 a sufficient number of times to reduce its BOD and COD levels to a low value.

Figure 3:
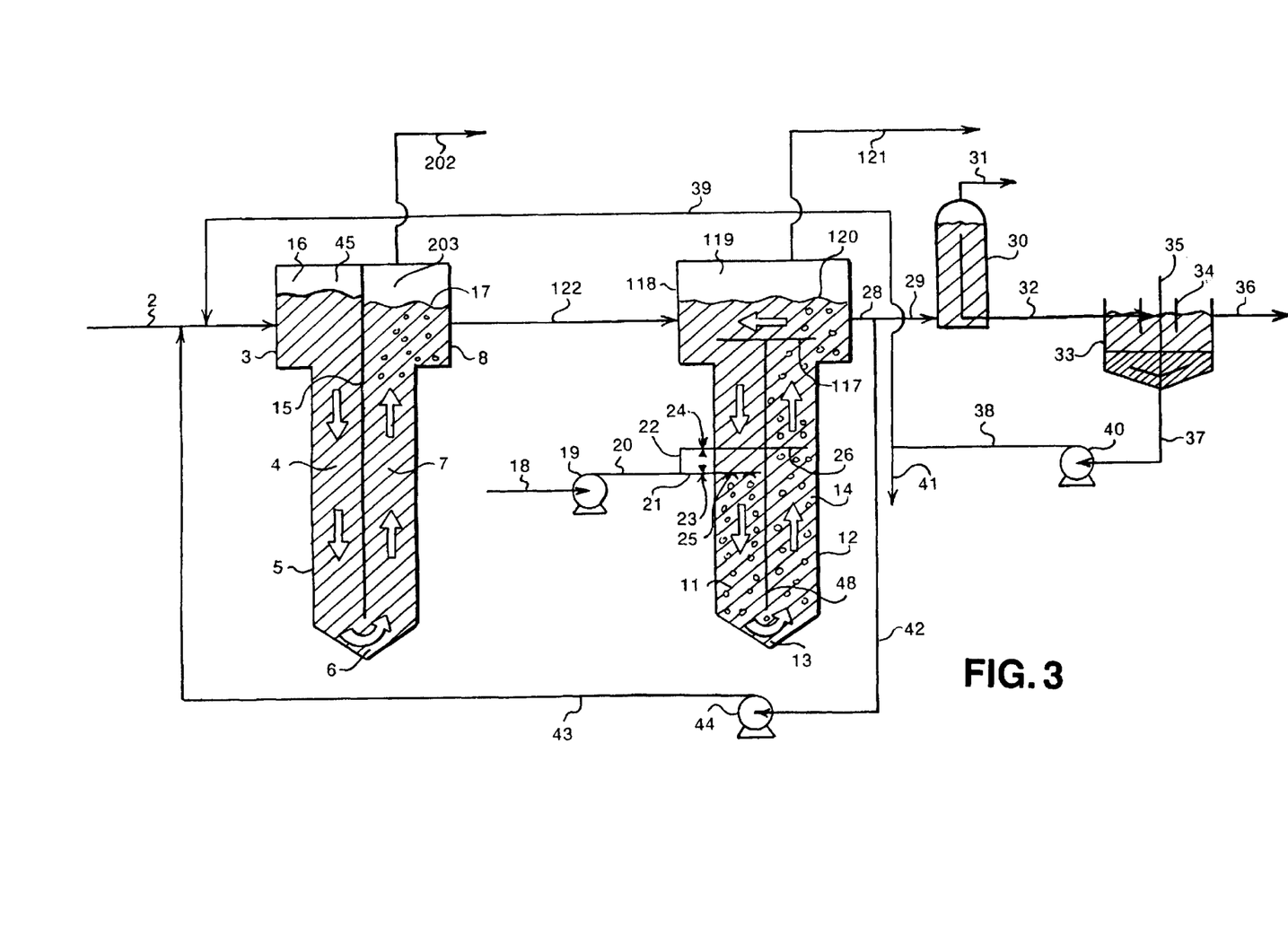

FIG. 3 shows an effluent treatment plant 201 of the "once through anoxic/recirculating aerobic" type. In FIG. 3 like parts to those of the plants 1 and 101 of FIGS. 1 and 2 bear like reference numerals.

In plant 201 effluent passes once through first elongate vessel 5 but can be recirculated a plurality of times through second elongate vessel 12. Nitrogenous gases evolved in passage of the effluent through the anoxic zone of first elongate vessel 5 are vented in line 202 from the headspace 203 above the surface 17 of effluent in header tank 8.

Instead of using a degassing tank 30 another form of degassing device can be used; suitable degassing devices include coarse or fine bubble degassing vessels.

It will further be appreciated by those skilled in the art that the vacuum degasser tank 31 and settling tank 33 can be replaced by a flotation clarifier.

What is claimed is:
1. A process for the treatment of effluent comprising:
(a) providing a first elongate vessel for anoxic metabolisation of effluent contained within the vessel, the first elongate vessel having a substantially vertical first downcomer zone for transport of effluent containing a population of aerobic and anoxic bacteria under substantially plug flow conditions towards a bottom region of the first elongate vessel, and a substantially vertical first riser zone for transport of effluent containing the population of aerobic and anoxic bacteria under substantially plug flow conditions towards a top region of the first elongate vessel, a bottom region of the first downcomer zone communicating with a bottom region of the first riser zone;

(b) supplying to a top region of the first downcomer zone an effluent to be treated containing a population of aerobic and anoxic bacteria at a feed rate corresponding to a dwell time in the first elongate vessel of from about 90 seconds to about 5 minutes;

(c) allowing the effluent to pass under substantially plug flow conditions through the first elongate vessel;

(d) recovering from the top of the first riser zone effluent that has passed through the first downcomer zone and the first riser zone and containing aerobic and anoxic bacteria;

(e) providing a second elongate vessel for aerobic metabolisation of effluent, the second elongate vessel having a substantially vertical second downcomer zone for transport of effluent containing aerobic and anoxic bacteria under substantially plug flow conditions towards a bottom region of the second elongate vessel, and a substantially vertical second riser zone for transport of effluent under substantially plug flow conditions towards a top region of the second elongate vessel, a bottom region of the second downcomer zone communicating with a bottom region of the second riser zone;

(f) feeding effluent containing aerobic and anoxic bacteria from the first elongate vessel to a top region of the second downcomer zone;

(g) injecting an oxygen-containing gas into the second elongate vessel so as at least in part to facilitate and maintain circulation of effluent through the second elongate vessel;

(h) recovering effluent containing aerobic and anoxic bacteria from the top region of the second riser zone; and (i) recycling at least a part of the effluent containing aerobic and anoxic bacteria recovered from the top region of the second riser zone to the top region of the first downcomer zone.

2. A process according to claim 1, in which at least one of the first and second elongate vessels comprises a pair of lined shafts sunk in the ground adjacent to one another with a lined tunnel joining the bottom ends thus forming a generally U-shaped vessel, the one shaft providing a downcomer zone and the other providing a riser zone.

3. A process according to claim 1, wherein the areas of cross section of each downcomer and its associated riser zone are selected so that the downward velocity of the effluent in the downcomer zone is higher than the upward velocity of the mixture of gas and effluent in the corresponding riser zone.

4. A process according to claim 1, wherein the feed means for supplying to a top region of the first downcomer zone an effluent to be treated comprises a header tank communicating with the first downcomer zone.

5. A process according to claim 1, wherein the gas injection means for injecting an oxygen-containing gas into the second elongate vessel includes means for injecting oxygen-containing gas into the second downcomer zone.

6. A process according to claim 1, wherein the gas injection means further comprises means for injecting oxygen-containing gas into the second riser zone to facilitate initiation of movement of effluent through the second elongate vessel by an air-lift pump action and, if desired, to assist in maintaining same.

7. A process according to claim 1, wherein the point of injection of oxygen-containing gas into the second downcomer zone and into the second riser zone is in each case at a position between 0.1 and 0.4 times its respective total depth.

8. A process according to claim 1, wherein air injection takes place at a position more than 30 meters down the second downcomer zone and down the second riser zone respectively.

9. A process according to claim 8, wherein the points of injection into the second downcomer zone and into the second riser zone respectively are at depths which are at essentially the same hydrostatic pressure when effluent is circulating.

10. A process according to claim 1, wherein the gas injection means comprises at least one flat-shaped tube having a plurality of lateral holes through which gas may be drawn laterally into the circulating effluent.

11. A process according to claim 1, wherein recovery of effluent from the second riser zone is effected in a degassing tank for degassing of effluent.

12. A process according to claim 1, wherein the feed means to the first downcomer zone comprises a first header tank, wherein the first recovery means comprises a second header tank communicating with the top of the first riser zone, and wherein the arrangement is such that the effluent surface level in the first header tank is higher than that in the second header tank whereby effluent can be caused to flow through the first elongate vessel.

13. A process according to claim 12, wherein the second header tank is provided with a weir over which effluent can flow to enter the top of the second downcomer zone.

14. A process according to claim 1, wherein the feed means to the first downcomer zone comprises a first header tank, wherein the first elongate vessel further comprises inert gas injection means for injecting inert gas into the first riser zone to facilitate and maintain movement of effluent through the first elongate vessel by a gas-lift pump action, and a degassing zone for degassing of effluent emerging from the top of the first riser zone, and wherein the degassing zone communicates with the first header tank to permit recycle of effluent from the degassing zone to the first downcomer zone.

15. A process according to claim 14, wherein the first elongate vessel further comprises gas recovery means for recovering gas from the degassing zone for recycle to the inert gas injection means.

16. A process according to claim 1, further comprising gas venting means for venting nitrogen-containing gases generated in the first elongate vessel.

17. A process according to claim 1, wherein effluent is fed from the first elongate vessel to a top region of the second downcomer zone at a rate corresponding to a dwell time in the second elongate vessel of from about 90 seconds to about 5 minutes.

18. A process according to claim 1, wherein part of the effluent that has passed through the second elongate vessel and contains aerobic and anoxic bacteria is passed to a settling tank in which solids present in the effluent are allowed to settle out from the effluent and wherein settled solids from the settling tank are recycled to the first elongate vessel.

* * * * *